(12) United States Patent
Cromer

(10) Patent No.: US 6,237,354 B1
(45) Date of Patent: May 29, 2001

(54) COOLING SYSTEM

(76) Inventor: Charles J. Cromer, 460 Indian Creek Dr., Cocoa Beach, FL (US) 32931

( * ) Notice: Subject to any disclaimer, the term of this patent is extended or adjusted under 35 U.S.C. 154(b) by 0 days.

(21) Appl. No.: 09/429,734

(22) Filed: Oct. 27, 1999

(51) Int. Cl.[7] .................................................. F25D 23/00
(52) U.S. Cl. .................................. 62/271; 62/93; 62/427
(58) Field of Search ................................. 62/271, 93, 94, 62/426, 427

(56) References Cited

U.S. PATENT DOCUMENTS

| | | | |
|---|---|---|---|
| 2,926,502 | * | 3/1960 | Munters et al. ........................... 62/94 |
| 4,180,985 | * | 1/1980 | Northrup, Jr. ............................. 62/94 |
| 4,380,910 | * | 4/1983 | Hood et al. ............................... 62/91 |
| 4,474,021 | * | 10/1984 | Harband .................................... 62/94 |
| 4,719,761 | * | 1/1988 | Cromer ..................................... 62/94 |
| 4,984,434 | * | 1/1991 | Peterson et al. .......................... 62/94 |
| 5,732,562 | * | 3/1998 | Moratalla ................................... 62/94 |
| 5,931,015 | * | 8/1999 | Madea ...................................... 62/271 |

FOREIGN PATENT DOCUMENTS

814449 * 6/1959 (GB) ........................................ 62/94

* cited by examiner

*Primary Examiner*—William Doerrler
*Assistant Examiner*—Melvin Jones
(74) *Attorney, Agent, or Firm*—William M. Hobby, III

(57) ABSTRACT

An air conditioning system moisture control method and apparatus has a housing having a heat exchanger therein for removing heat and moisture from the air. The housing has a main air inlet thereinto and a main air outlet therefrom. Moisture is added to the inlet air and some of the moisture laden air is then directed from the housing through a secondary air outlet. A secondary air inlet draws outside air into the housing between the main air inlet and the heat exchanger. The moisture laden inlet air is then cooled and has moisture removed by passage through the heat exchanger. Additional moisture is then removed in the air conditioning outlet using a desiccant material, or the like, so that dew point of the air entering the heat exchanger housing is increased to improve moisture removal in the air conditioning system. The moisture removal method includes removing the moisture by desiccant from the saturated air leaving the air conditioning housing outlet and delivering the removed moisture to the dry air entering the air conditioning housing main inlet. A secondary heat exchanger is utilized between the secondary air outlet and the secondary air inlet and dampers are provided for the secondary air inlets and outlets. The system increases the dehumidification of an air cooling system.

10 Claims, 1 Drawing Sheet

COOLING SYSTEM

BACKGROUND OF THE INVENTION

The present invention relates to a method and apparatus of removing moisture from air passing through an air cooling system and is an improvement over my prior U.S. Pat. No. 4,719,761 of Jan. 19, 1988 for a Cooling System.

My prior patent was a method and apparatus for increasing removal of moisture in a cooling system which provided for a desiccant to contact and evaporate moisture into the dry feed air prior to passing the feed air over cooling coils to increase the dew point or moisture content of the feed air. This increased the moisture removal of the cooling system. A desiccant material is loaded with moisture by absorption of moisture from the moisture saturated air leaving the cooling coils. The method included removing the moisture by desiccant from the saturated air leaving a cooling means and delivering the moisture to dry air entering the cooling means to increase the dehumidification of the cooling means. The improvements involve the handling of fresh air being brought into the cooling system from outside a building and the expungement of air from inside a building.

The air to be expunged is taken from the space within the cooling system directly after entering the system and passing through the desiccant coil but before the cooling coils of the cooling system. Fresh or make-up air is added at the same place in the cycle. Part of the air having increased moisture that has passed through the desiccant moisture transfer means, and which has had moisture added thereto, is used as the air that is to be expunged from inside the building. This allows an improvement in total moisture removal of the basic cooling system over simply expunging the indoor air because the air with increased moisture has a higher moisture content at this point. The indoor air is brought in adjacent the passageway for the expunged air and a further improvement in overall efficiency is achieved by adding a heat exchanger between the inlet for the outside air and the outlet air stream of the air being expunged from the system. This heat exchanger on the inlet and outlet air streams of the system is an improvement because the wetting process of the desiccant, by evaporation of water into the air stream, cools the air colder than the indoor air conditioned air used by existing heat exchangers. Thus, the heat exchange is improved and the load introduced by the fresh air is less than with existing heat exchangers.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENTS

Figure 1:
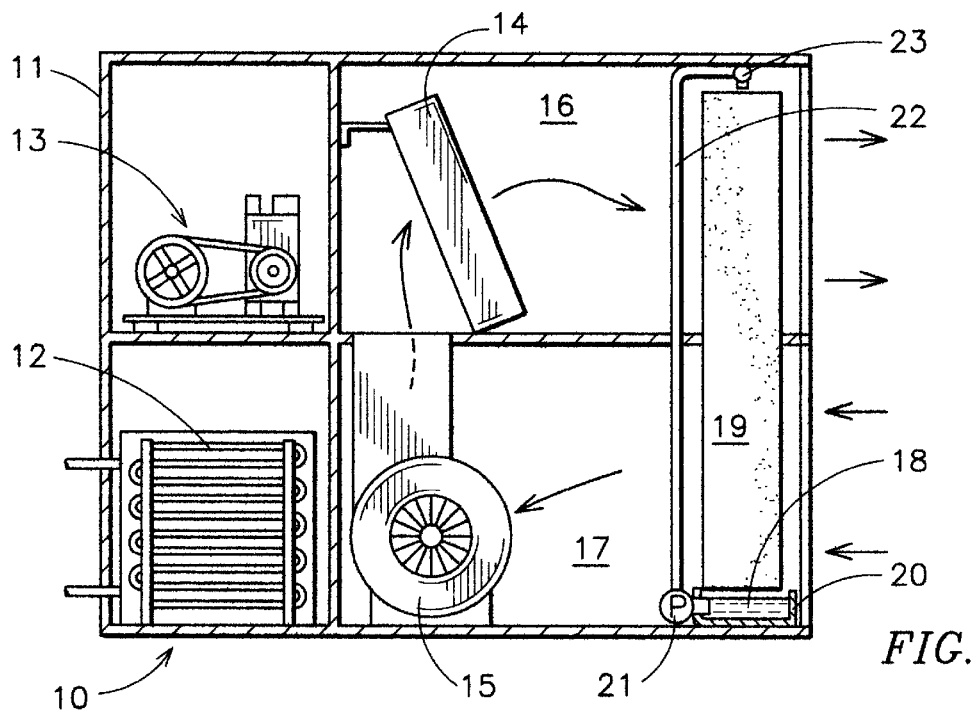
FIG. 1 is a side sectional view of a moisture removal system in accordance with my prior patent.

Referring to FIG. 1, my prior air conditioning and moisture removal system 10 is illustrated placed in a housing 11 and having the standard air conditioning components of a condenser 12, which may be a water source or an air-to-air type condenser. The system has a compressor 13 which compresses a refrigerant in the system. The refrigerant is liquified in the condenser 12 and has the heat removed through a heat exchanger forming a part of the condenser and then expands into a cooling coil 14. The cooling coil acts as a heat exchanger and is positioned for air to pass through, as shown by the arrows, through a blower or fan 15 through the cooling coil 14 and out an exit passage 16. An inlet passage 17 brings in the dry feed air drawn by the blower 15 and passes through the cooling coil and heat exchanger 14 and out the exit 16. A plurality of vertically extending evaporator pads 19 extend across the inlet passage 17 and across the exit passage 16. A liquid desiccant 18 collects in a trough 20 where a pump 21 pumps the liquid through a line 22 through nozzles 23 where it is sprayed onto the pads 19. The liquid desiccant allows the pads 19 to capture additional moisture leaving the exit passage 16 to let the moisture drain down the pads 19 through the inlet passage 17 where the dry feed air is entering the system and where the moisture is then evaporated back into the dry feed air and partially removed by the cooling coils 14 and further removed by the liquid desiccant passing down the pads 19 to the exit air.

Figure 2:
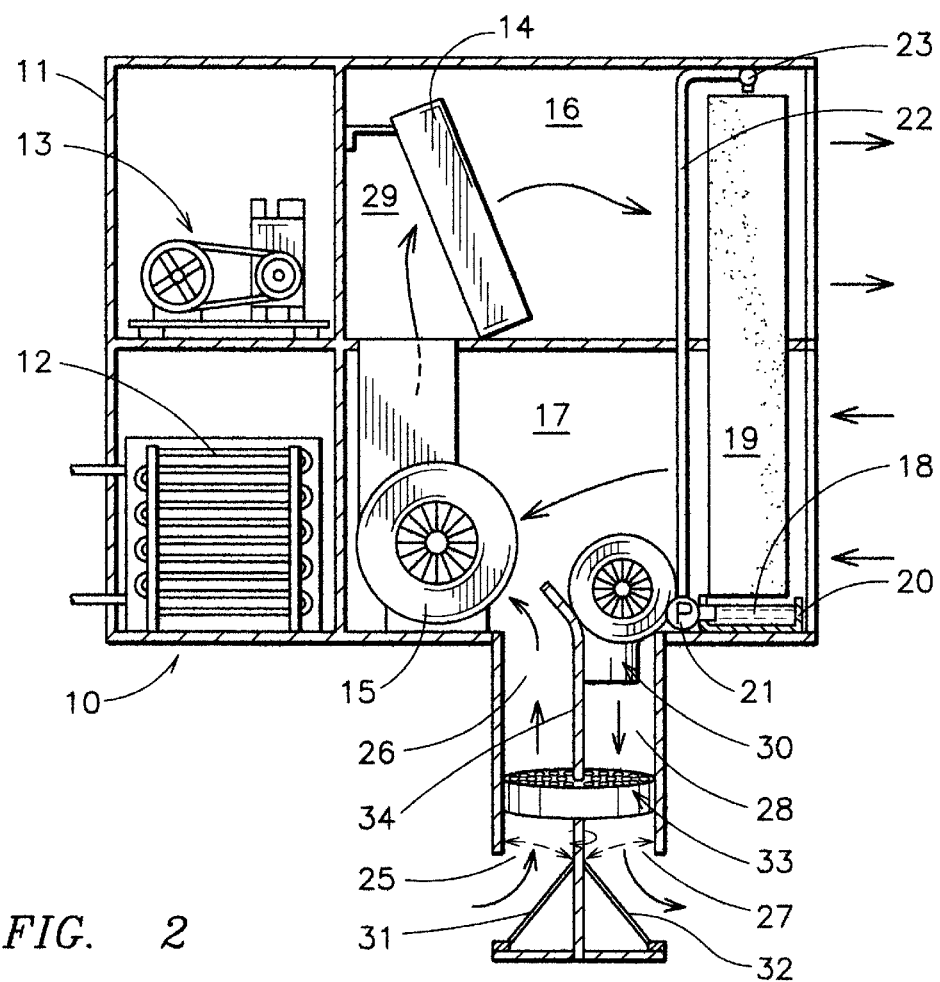
FIG. 2 is a side sectional view of a moisture removal system incorporating my improvement on the handling of fresh air intake.

This system has the improvements, as shown in FIG. 2, which has a fresh air intake 25 entering into a fresh air intake passageway 26 and an expunged air outlet 27 receiving air from an expunged air passageway 28. The outside air enters from the outside air entrance 25, as shown by the arrows, and is pulled into the housing 11 by the blower 15. The air being expunged through the exit passageway 28 is the air immediately after it passes through the desiccant moisture transfer means 19 where it has picked up moisture and where a blower 30 draws the air and directs it through the passageway 28 and out the exit 27 to the outside air.

As illustrated, the system provides a air intake baffle 31 which can adjust the opening 25 to vary and control the air entering the entrance 25 into the air conditioning system from outside. Similarly, a damper 32 is placed over the entrance 27 of the exhaust air passageway 28 to control the flow of the air out of the system to the outside air. Additional control of the flow of the air out of the system to the outside may also be provided by adjustment of the speed of blower 30. The efficiency of this system is further improved by a heat recovery system 33 which is a heat exchanger placed across the wall 34 dividing the air inlet passageway 26 and the air outlet passageway 28. The illustrated heat recover system 33 is a wheel which collects heat from the outside air entering the passageway entrance 25 and transfers that heat to the other side where the moisture laden air passing through the passageway 28 picks up the heat as it passes through the heat exchanger 33 and the outlet air passageway 27 out of the system. The heat transfer means shown is a rotary wheel heat exchanger but it should be clear that any type of heat exchanger desired can be utilized without departing from the spirit and scope of the invention. In the preferred embodiment, passageways 26 and 28 are open to inlet passage 17. It should be clear that the same improvement is made by having the passageways 26 and 28 open into passage area 29, after blower 15. The moisture laden air is still expunged out of the system through passageway 28, in this case by the air pressure of blower 15, and the air flow of blower 30 is reversed and placed to pull air into housing 11 through the air inlet passageway 26.

Thus, air to be expunged from inside of a building is collected from a space directly after the desiccant coil 19 and before the cooling means 14 by the use of the blower 30 positioned in the housing 11.

The air that has been wetted by the moisture in the pads 19 passing through the desiccant moisture transfer pads 19 has had moisture added to it and is expunged from the space through the passageway 28. This provides an improvement in total moisture removal over simply expunging indoor air because the wetted air has a higher moisture content. The overall efficiency is further improved by adding the heat exchanger 33 between the inlet passageway 26 and the outlet passageway 28. The heat exchanger 33 improves the system because the wetting process of the desiccant by evaporation of water into the air stream cools the air colder than the indoor air condition used by the existing heat exchanger so that the heat exchange is improved and the load introduced by the fresh air is lessened.

It should be clear at this time that the present invention is a method and apparatus for removing moisture from air passing through an air cooling system which enhances my prior cooling system, as set forth in my prior patent. However, the cooling system should not be considered as limited to the forms shown which are to be considered illustrative rather than restrictive.

I claim:

1. An air cooling system comprising:
   an air conditioning system having a housing having a heat exchanger therein for removing heat and moisture from air passing therethrough, said housing having a main air inlet thereinto for bringing air into said housing and a main air outlet therefrom and forming a housing passageway therebetween;
   moisture evaporative means for adding moisture to the inlet air passing into said housing through said main air inlet;
   secondary air outlet located in said housing between said main air inlet and said heat exchanger to remove air from said housing passageway;
   secondary air inlet located in said air conditioning system housing between said main air inlet and said heat exchanger to bring in air into said housing passageway from outside said air conditioning housing;
   moisture removal means for capturing moisture from air from said main and secondary air inlets that has passed through said heat exchanger and before exiting said air conditioning system housing, whereby the dew point of the air entering said heat exchanger housing is increased prior to removing moisture in the heat exchanger and moisture removal means to obtain increased moisture removal in an air conditioning system.

2. An air cooling system in accordance with claim 1 in which said conditioner system housing has means to feed moisture removed by said moisture removal means to the moisture evaporative means for adding removed moisture back to the inlet air of the air conditioning system.

3. An air cooling system in accordance with claim 1 in which said air conditioner system secondary air inlet and said secondary outlet are each air ducts mounted adjacent to each other.

4. An air cooling system in accordance with claim 2 in which said air conditioner system has a secondary heat exchanger mounted between said secondary air inlet and outlet ducts to transfer heat between the air passing through said secondary inlet duct and to the air passing out said secondary outlet duct.

5. An air cooling system in accordance with claim 4 in which said conditioner system secondary heat exchanger is a heat recovery wheel mounted between said secondary air inlet duct and said secondary air outlet duct.

6. An air cooling system in accordance with claim 5 in which said conditioner system secondary air outlet duct has a damper therein to control the secondary outlet air.

7. An air cooling system in accordance with claim 6 in which said conditioner system secondary air inlet duct has a damper therein to control the secondary inlet air.

8. An air cooling system moisture control method comprising the steps of:
   selecting an air conditioning system having a housing having a heat exchanger therein for removing heat from air, said housing having a main air inlet thereinto for receiving dry feed air into said housing and a main air outlet from said housing and having a housing passageway and a secondary air inlet in said housing for directing air into said housing passageway and a secondary air outlet in said housing for directing air from said housing passageway;
   evaporating moisture into the dry feed air entering the housing main air inlet;
   removing a portion of the air entering the housing main air inlet through said secondary air outlet after having moisture evaporated thereinto;
   drawing air from outside said air conditioning housing through said secondary air inlet in said air conditioning system housing into the housing passageway between said main air inlet and said heat exchanger;
   removing moisture from said inlet air from said main air inlet and said secondary air inlet in said heat exchanger; and
   evaporating additional moisture from the air exiting the air conditioning housing through the main air outlet, whereby the dew point of the air entering an air conditioning system housing is increased prior to moisture removal in the air conditioning system.

9. An air cooling system moisture control method in accordance with claim 8 including evaporating moisture removed from the air exiting the air conditioning housing into the dry feed air entering the housing main air inlet.

10. An air cooling system moisture control method in accordance with claim 8 including transferring heat through a secondary heat exchanger between said secondary air inlet and said secondary air outlet.

* * * * *